US005852403A

United States Patent [19]
Boardman

[11] Patent Number: 5,852,403
[45] Date of Patent: *Dec. 22, 1998

[54] WIRELESS PET CONTAINMENT SYSTEM

[75] Inventor: Allen H. Boardman, Maryville, Tenn.

[73] Assignee: Radio Systems Corporation, Knoxville, Tenn.

[*] Notice: The term of this patent shall not extend beyond the expiration date of Pat. No. 5,381,129.

[21] Appl. No.: 368,357

[22] Filed: Jan. 4, 1995

Related U.S. Application Data

[63] Continuation-in-part of Ser. No. 216,691, Mar. 23, 1994, Pat. No. 5,381,129.

[51] Int. Cl.$^6$ .............................. G08B 21/00; A01K 15/02
[52] U.S. Cl. ............................................ 340/573; 119/721
[58] Field of Search ................................. 340/573, 572, 340/540, 539, 529; 119/721

[56] References Cited

U.S. PATENT DOCUMENTS

| | | | |
|---|---|---|---|
| 3,478,344 | 11/1969 | Schwitzgebel | 340/539 |
| 3,589,337 | 6/1971 | Doss | 119/720 |
| 3,753,421 | 8/1973 | Peck | 119/721 |
| 4,675,656 | 6/1987 | Narcisse | 340/539 |
| 4,898,120 | 2/1990 | Brose | 119/721 |
| 4,999,613 | 3/1991 | Williamson et al. | 340/529 |
| 5,067,441 | 11/1991 | Weinstein | 119/721 |
| 5,121,711 | 6/1992 | Aine | 119/721 |
| 5,381,129 | 1/1995 | Boardman | 340/573 |

Primary Examiner—Glen Swann
Attorney, Agent, or Firm—Pitts & Brittian, P.C.

[57] ABSTRACT

A pet containment system which comprises a transmitter for transmitting a series of electromagnetic signals, and a receiver removably attached to the pet for receiving the series of electromagnetic signals from the transmitter. The transmitter includes means for generating the electromagnetic signals, means for transmitting the electromagnetic signals, and at least one transmitting antenna. The receiver includes at least one receiving antenna, means for comparing the phase of the received electromagnetic signals from the transmitter with a predetermined phase and for producing an electronic indication of a loss of phase, and means for producing a control stimulus to the pet. The present invention also provides a method for producing an area for the containment of a pet.

30 Claims, 4 Drawing Sheets

WIRELESS PET CONTAINMENT SYSTEM

The present application is a continuation-in-part of U.S. Ser. No. 216,691, filed Mar. 23, 1994, now U.S. Pat. No. 5,381,129 issued Jan. 10, 1995, which is incorporated herein by reference.

FIELD OF THE INVENTION

The present invention relates to pet containment systems. More specifically, the present invention relates to those systems which use stimulus means in order to train a pet to remain within a predefined area.

BACKGROUND OF THE INVENTION

For the past twenty years, a number of systems have been developed to provide means for containing pets within a certain predefined area. U.S. Pat. No. 3,753,421 to Peck discloses a system which uses a wire to define the boundary of the area to which the animal is to be restrained. In its most general use, the wire is laid out on the ground or buried a short distance beneath the surface of the ground and then connected to a transmitter system. The transmitter system sets up an electrical field in the wire which determines the boundary of the unit. The pet wears a collar which has a receiver and a stimulus system for providing a stimulus to the pet when the pet moves too close to the wire. Often, the collar contains two stimuli systems, one to give an audio warning to tell the pet that it is approaching the boundary and another to give a shock to further warn the pet that it is too close to the boundary.

This system has enjoyed some success but has a number of limitations in that it is rather expensive to obtain the amount of wire needed for a reasonable area and is time consuming or expensive to bury the amount of wire used. In addition, if the pet is somehow able to go beyond the boundary wire, it will receive a stimulus to keep it away from the wire as it tries to re-enter the desired boundary area. Thus, there is no impetus for the pet to return to the desired area.

U.S. Pat. No. 4,898,120 to Brose sets forth a more sophisticated system in which the parameters of an area in which an animal are to be restrained are determined by evaluating a signal received by a central receiver sent from a transmitter on the animal. This central unit may then transmit a signal to a device worn by the animal to generate a warning shock, sound or the like.

This system enables a more sophisticated determination of the area in which the animal is free to roam and avoids the necessity for exposed wires about the parameter. However, such a system is cumbersome to use.

U.S. Pat. No. 5,067,441 to Weinstein also discloses a wireless system for restricting animals to a defined area. The system of Weinstein uses a transmitting system which generates radio signals to be located in or adjacent an area in which an animal is to be restrained. There is a unit adapted to be worn by the animal which receives the signals from the transmitting system. The collar system has a multiplicity of radio receivers each having a separate receiving antenna.

The system disclosed by Weinstein requires a complex evaluation of the orientation of the received radio signals. A vector summation is performed on those received signals to determine exactly where the animal is within a particular area. The system requires a large amount of power consumption in the receiver and, therefore, requires recharging or replacement of the battery in the collar every night.

Therefore, there is a need for a wireless pet containment system which is relatively simple to use by the consumer and does not use so much power as to inconveniently require frequent recharging or replacement of batteries in the pet's collar.

It is an object of the present invention to provide a pet containment system which uses a wireless means to control a pet within a particular area.

It is a further object of the present invention to provide such a system which operates effectively over a reasonably long period of time without frequent replacement or recharging of batteries in a pet collar.

SUMMARY OF THE INVENTION

Having regard to the above and other objects and advantages, the present invention generally provides for a pet containment system which comprises a transmitter for transmitting a series of electromagnetic signals, and a receiver removably attached to the pet for receiving the series of electromagnetic signals from the transmitter. The transmitter further includes means for generating the electromagnetic signals, means for transmitting the electromagnetic signals, and at least one transmitting antenna.

The receiver includes at least one receiving antenna and further includes means for comparing the phase of the received electromagnetic signals from said transmitter with a predetermined phase and for producing an electronic indication of a loss of phase. If the phase of the received electromagnetic signals from said transmitter is not substantially in phase with the predetermined phase then the electronic indication of a loss of phase is produced. The preferred receiver also comprises means for producing a control stimulus to the pet. The means for producing the control stimulus operate such that when there is no electronic indication of a loss of phase, then there is no control stimulus to the pet and when there is an electronic indication of a loss of phase, then there is a control stimulus to the pet.

In another preferred embodiment, the receiver further includes means for producing a warning stimulus to the pet, and timing means. The timing means gives an indication of the amount of time since the loss of phase. The means for producing the warning stimulus operates in concert with the control stimuli such that when there is no electronic indication of a loss of phase, then there is no warning stimulus and there is no control stimulus to the pet, when there is an electronic indication of a loss of phase and the timing means gives an indication of an amount of time of less than a predetermined value, then there is a warning stimulus to the pet, and when there is an electronic indication of a loss of phase and the timing means gives an indication of an amount of time of greater than the predetermined value, then there is a control stimulus to the pet.

In another preferred embodiment of the invention, the transmitter further includes means for modulating the electro-magnetic signals, wherein the signals are modulated to produce non-random patterns of electromagnetic energy, and the means for comparing the signal phase of the electromagnetic signals transmitted by said transmitter further includes means for demodulating the received electromagnetic signals transmitted by the transmitter, thereby producing a demodulated signal, and at least one phase-locked loop for receiving the demodulated signal and for producing an electronic indication of a loss of phase. Thus, when the phase-locked loop indicates that the phase of the demodulated received signal is different than a reference phase then the phase-locked loop generates an electronic indication of a loss of phase.

In another preferred embodiment of the invention, the receiver includes means for comparing the signal level of the received electromagnetic signals from said transmitter with a predetermined level and for producing an electronic indication of a loss of signal level, wherein if the signal level of the received electromagnetic signals from said transmitter is less than the predetermined level then the electronic indication of a loss of signal level is produced. Further, the receiver includes means for determining the presence of the received electromagnetic signals from said transmitter and for producing an electronic indication of a loss of received signal, wherein if the electromagnetic signals from said transmitter are not substantially present then the electronic indication of a loss of received signal is produced.

The receiver also comprises means for producing a warning stimulus to the pet, and means for producing a control stimulus to the pet. The means for producing the warning and control stimuli operate such that when there is no electronic indication of a loss of signal level and there is no electronic indication of a loss of received signal, then there is no warning stimulus and there is no control stimulus to the pet, when there is an electronic indication of a loss of signal level and there is no electronic indication of a loss of received signal, then there is a warning stimulus to the pet, and when there is an electronic indication of a loss of signal level and there is an electronic indication of a loss of received signal, then there is a control stimulus to the pet.

In a preferred embodiment of the present invention, the electromagnetic signals transmitted by the transmitter are frequency or amplitude modulated. It is further preferred that the modulated electromagnetic signals transmitted by the transmitter are modulated in a pulse train having a particular nonrandom pattern.

In yet another preferred embodiment of the present invention, the receiver further comprises a speaker and the warning stimulus includes a sound. In still another preferred embodiment, the receiver further comprises a light source and the warning stimulus includes a light. It is also preferred that the receiver further comprises electrodes and the control stimulus includes a shock to the pet.

It is also preferred that the electromagnetic energy of the electromagnetic signals is radio frequency energy or light.

The present invention also provides a method for producing an area for the containment of a pet comprising transmitting a series of electromagnetic signals, and attaching a releasable electromagnetic energy receiver to the pet.

The series of electromagnetic signals is received with the releasable electromagnetic energy receiver, and the phase of the received electromagnetic signals received with the releasable electromagnetic energy receiver is compared with a predetermined phase to produce an electronic indication of a loss of phase. Thus, if the phase of the received electromagnetic signals with the releasable electromagnetic energy receiver is not substantially in phase with the predetermined phase then the electronic indication of a loss of phase is produced.

No control stimulus to the pet is produced when there is no electronic indication of a loss of phase. A control stimulus to the pet is produced when there is an electronic indication of a loss of phase.

It is also preferred that the step of transmitting the series of electromagnetic signals further includes modulating the electromagnetic signals, wherein the signals are modulated to produce non-random patterns of electromagnetic energy and transmitting the non-random patterns of electromagnetic energy. The step of comparing the signal phase of the electromagnetic signals received with the releasable electromagnetic energy receiver then further includes demodulating the received electromagnetic signals, thereby producing a demodulated signal, and receiving the demodulated signal in at least one phase-locked loop to produce an electronic indication of a loss of phase. Thus, when the phase-locked loop indicates that the phase of the demodulated received signal is different than a reference phase, then the phase-locked loop generates an electronic indication of a loss of phase. It is also preferred that the electromagnetic energy of the non-random patterns of electromagnetic energy is radio frequency energy or light.

In another preferred embodiment of the invention, a timing signal is provided which indicates a loss of phase for greater than a predetermined period of time. Thus, if the phase of the received electromagnetic signals with the releasable electromagnetic energy receiver is not substantially in phase with the predetermined phase then the electronic indication of a loss of phase is produced and a timing signal is also produced after a predetermined period of time.

No stimulus to the pet is produced when there is no electronic indication of a loss of phase. A warning stimulus to the pet is produced when there is an electronic indication of a loss of phase and there is no timing signal indicating a loss of phase for greater than a predetermined period of time. A control stimulus to the pet is produced when there is an electronic indication of a loss of phase and there is a timing signal indicating a loss of phase for greater than a predetermined period of time.

In another preferred embodiment of the invention, the series of electromagnetic signals is received with the releasable electromagnetic energy receiver, and the signal level of the received electromagnetic signals received with the releasable electromagnetic energy receiver is compared with a predetermined level to produce an electronic indication of a loss of signal level. If the signal level of the received electromagnetic signals with the releasable electromagnetic energy receiver is less than the predetermined level then the electronic indication of a loss of signal level is produced.

The received electromagnetic signals received with the releasable electromagnetic energy receiver is also demodulated to produce an electronic indication of a loss of received signal. Thus, if the received electromagnetic signals with the releasable electromagnetic energy receiver are not substantially detectable by the demodulator then the electronic indication of a loss of received signal is produced.

No warning stimulus to the pet is produced when there is no electronic indication of a loss of signal level and there is no electronic indication of a loss of received signal. A warning stimulus to the pet is produced when there is an electronic indication of a loss of signal level and there is no electronic indication of a loss of received signal. A control stimulus to the pet is produced when there is an electronic indication of a loss of signal level and there is an electronic indication of a loss of received signal.

In a preferred embodiment of the invention, the transmitted electromagnetic signals are frequency or amplitude modulated, and the transmitted electromagnetic signals are modulated in a pulse train having a particular nonrandom pattern.

BRIEF DESCRIPTION OF THE DRAWINGS

In order to provide a further explanation of the present invention the following drawings are provided in which.

DETAILED DESCRIPTION OF THE INVENTION

Figure 1:
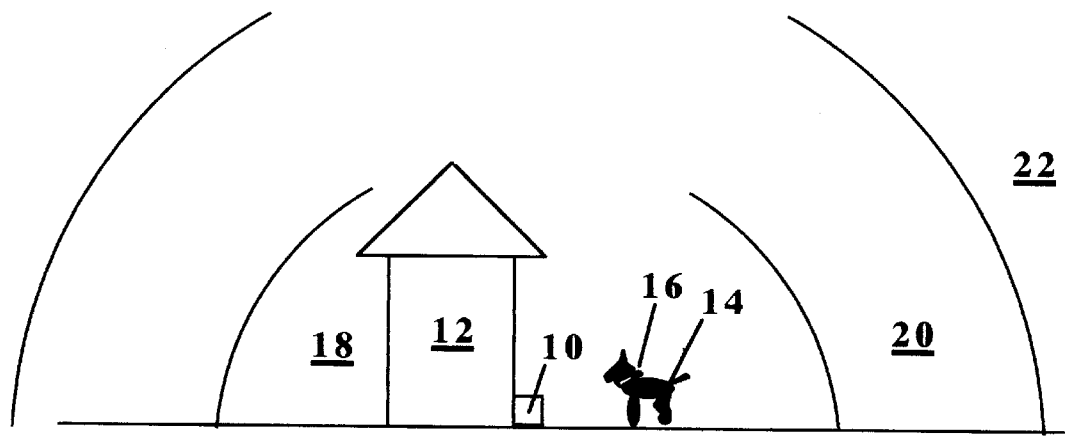
FIG. 1 is a schematic illustration of an environment utilizing the pet containment system of the present invention.

Referring now to the drawings, FIG. 1 is an exemplary drawing of the environment in which the pet containment system of the present invention may be used. A transmitter 10 is generally placed in or near a house 12 which is situated generally within the area to which the pet 14 is to be confined. The pet 14 wears a collar/receiver 16 which contains stimulus systems which give a warning or shock to the pet 14 if the pet wanders too close to the boundaries of the system.

The safe area 18 comprises an area in which the pet receives no stimuli from the collar/receiver 16. When the pet moves into the warning area 20, the collar/receiver 16 gives a warning signal, in the nature of a sound or flashing light or other indication to the pet 14. When the pet 14 moves into the shock area 22, the collar/receiver 16 generates a control signal which is usually a shock to indicate to the pet that it is in a shock area 22. Thus, the pet 14 is trained to remain within the safe area 18 but if the pet 14 moves into the warning area 20 it will be warned to move back into the safe area 18.

Figure 2:
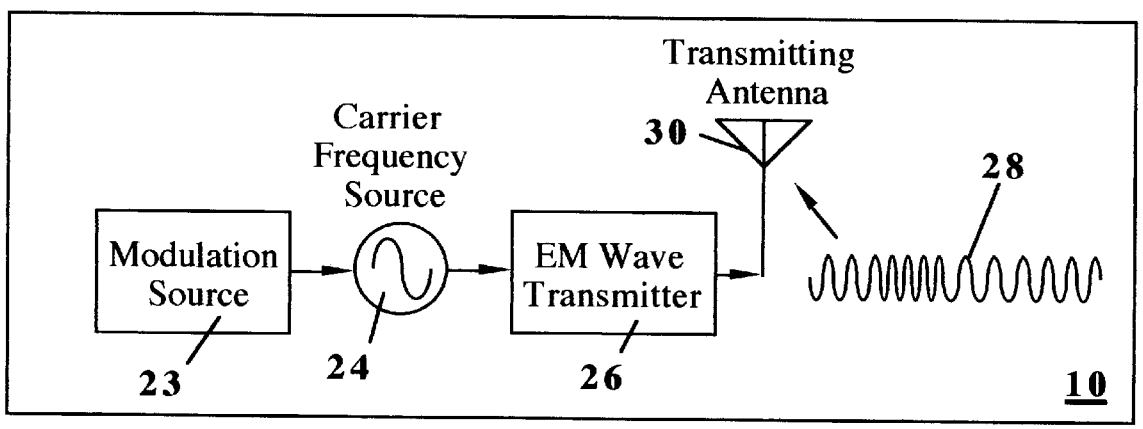
FIG. 2 is a block diagram of a transmitting system according to the present invention.

Referring now to FIG. 2, there is shown a block diagram of an embodiment of the transmitter 10. A modulation source 23 supplies a modulating signal to a carrier frequency source 24. The modulation source 23 modulates the carrier frequency and supplies a modulated signal to an electromagnetic wave transmitter 26. The electromagnetic wave transmitter 26 then sends a signal 28 to a transmitting antenna 30. The transmitted signal 28 is then received by the receiver 16. The modulation source 23 may be omitted from the transmitter 10 if desired. In that case, the transmitted signal 28 consists of a carrier frequency alone.

Figure 3:
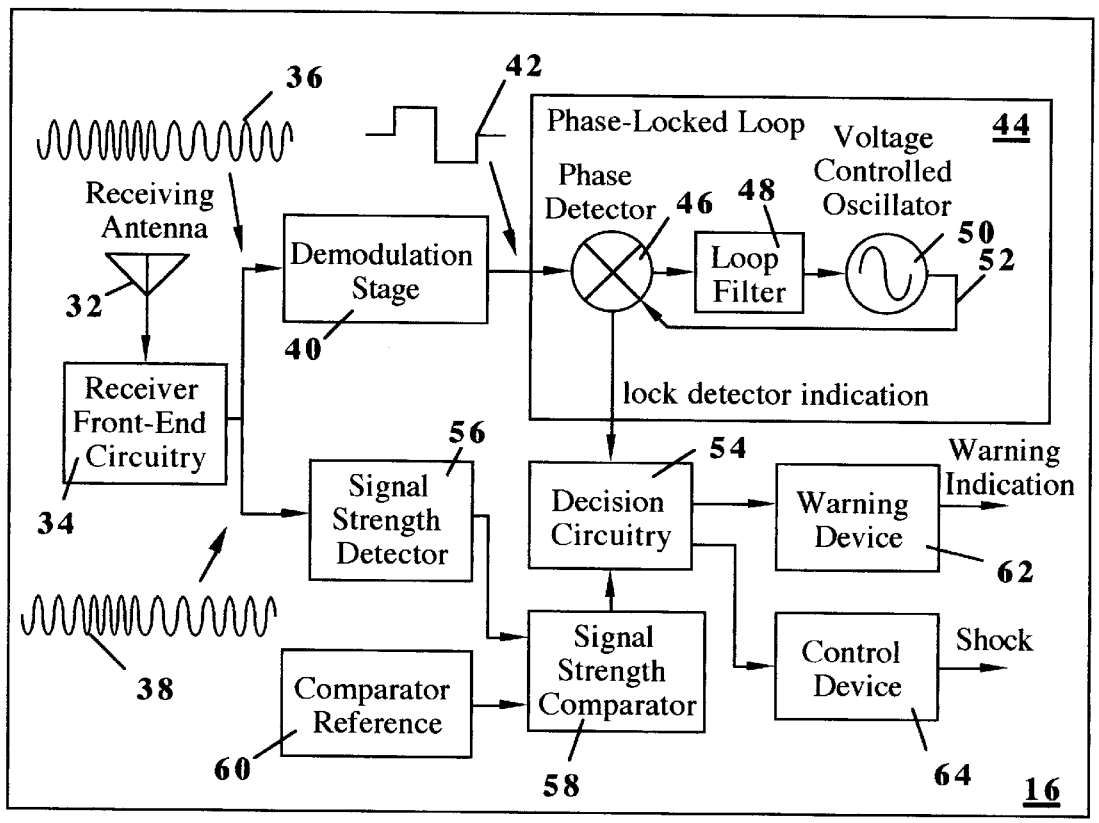
FIG. 3 is a block diagram of one embodiment of a receiver according to the present invention.

FIG. 3 shows a block diagram of a preferred embodiment of a receiver 16 according to the present invention. The transmitted signal 28 is received by the receiving antenna 32 which is then sent to the receiver-front end circuitry 34. The signal is then divided into two signals, a phase detected signal 36 and a strength detected signal 38. Both of these signals are identified by their intended use.

The phase detected signal 36 is sent to a demodulator stage 40 which produces a demodulated signal 42. The demodulated signal 42 is sent to a phase-locked loop 44 for determining whether or not the signal 42 is in phase with the expected signal. If the modulation source 23 has been omitted from the transmitter 10, then the phase detected signal 36 is sent directly to the phase-locked loop 44. The demodulator stage 40 is omitted from the receiver 16. A typical phase-locked loop 44 integrated circuit is a CD4046 phase-locked loop.

The phase-locked loop 44 acts as a phase tracker: so long as a phase of the signal is discernable, the output of the phase-locked loop 44 is a constant predetermined voltage level which generally is a logical true value. When the phase is lost, the output of the phase-locked loop 44 is a logical false value.

A phase detector 46, loop filter 48, and voltage controlled oscillator 50 measure the phase of the signal 42 and determine whether or not it is of the same phase as a reference phase. The feedback loop 52 determines the output of the phase detector 46 and the phase-locked loop 44 to the decision circuitry 54. If the signal 42 is in phase, the output from the phase detector 46 will be a logical true value. Any other phase will generate a logical false value from the phase detector 46. Thus, if the signal is in phase the decision circuitry 54 receives a logical true value signal from the phase detector 46 and receives a logical false value if the system is out of phase.

The strength detected signal 38 is sent to a signal strength detector 56 and is then sent to a signal strength comparator 58. A comparator reference 60 sends a comparison signal to signal strength comparator 58 which then sends an output to the decision circuitry 54. If the signal from the signal strength detector 56 is less than the signal strength from the comparator reference 60, the signal strength comparator 58 sends a signal to the decision circuitry 54 indicating that the strength detected signal 38 has dropped below the particular strength of the comparator reference 60.

The decision circuitry 54 determines whether or not a warning indication or a shock will be given to the pet 14. If the decision circuitry 54 receives a signal from the phase detector 46 and receives no indication from the signal strength comparator 58 that the strength detected signal 38 has dropped below the comparator reference 60, then there will be no warning indication or shock to the pet. Thus, referring now to FIG. 1, the pet 14 is within the safe area 18.

If the pet 14 wanders into the warning area 20, the signal from the phase detector 46 will still be a logical true value since the detected signal will be strong enough to allow the phase locked loop 44 to track its phase. However, the signal strength of the strength detected signal 38 will have dropped below the comparator reference 60. Therefore, the output from the signal strength comparator 58 will indicate to the decision circuitry 54 that a warning is indicated. The decision circuitry 54 will send a signal to the warning device 62 which will give a warning to the pet 14. This warning indication usually is in the form of a sound produced by a small speaker within the collar/receiver 16.

If the pet goes further, into the shock area 22, the demodulated signal 42 will have degraded to a point where it will no longer be in phase. Therefore, the phase detector 46 will generate a logical false value to the decision circuity 54. In addition, the signal strength comparator 58 will still produce an indication that the strength detected signal 38 is below that of the comparator reference 60. Therefore, the decision circuitry 54 will generate a signal to the control device 64 which will produce a control signal such as a shock from electrodes in the collar/receiver 16.

Thus, a pet 14 will be signaled that it is in a shock area 22 no matter how far it goes from the transmitter. The only time the shocking will stop will be when the pet re-enters the warning area 20 or the safe area 18.

If modulated, the transmitted signal 28 may be in the form of a train of modulated signals. Thus, the transmitted signal 28 may contain information particular to the individual transmitter 10 and collar/receiver 16. The particular information may be adjusted, either in the factory or by the consumer, to allow a series of transmitters 10 to be used to form a larger safe area 18 than would be possible with a single transmitter 10. In the alternative, transmitters 10 of neighbors may be adjusted such that both systems use different trains of modulated signals. The collar/receivers 16 would be correspondingly adjusted to allow use with the adjusted transmitter 10.

Figure 4:
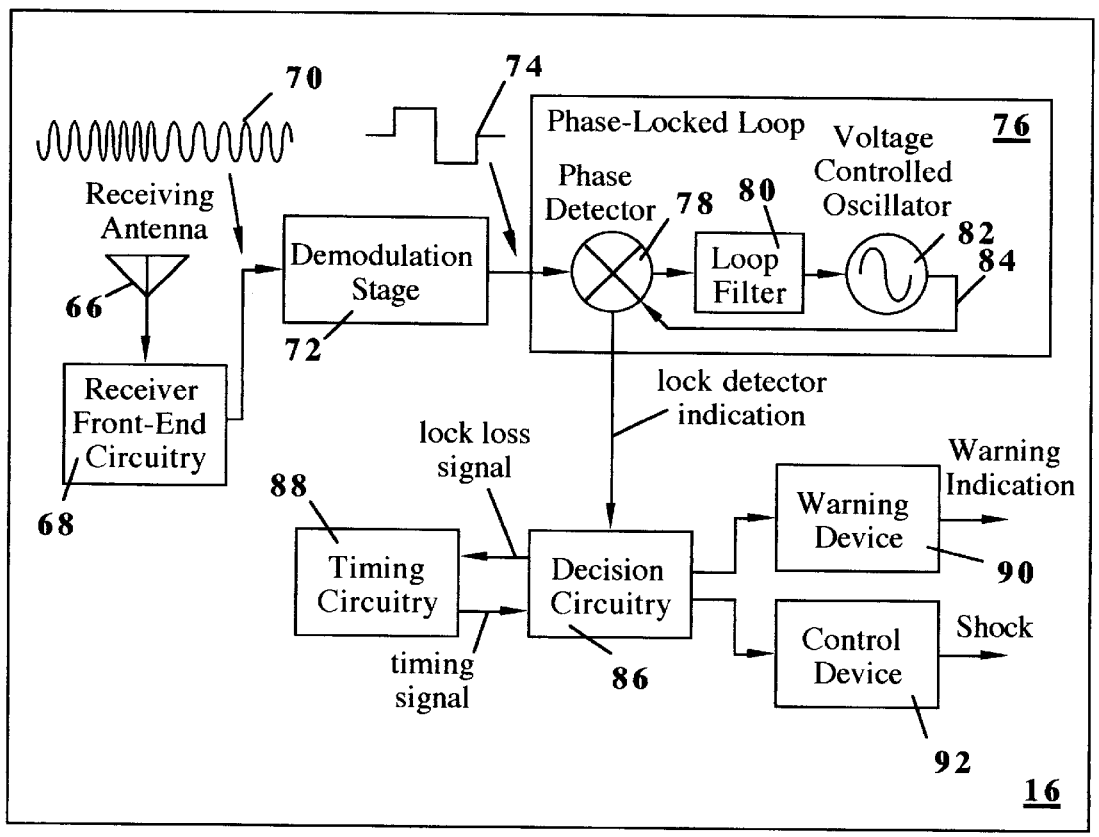
FIG. 4 is a block diagram of another embodiment of a receiver according to the present invention.

FIG. 4 shows a block diagram of another preferred embodiment of a receiver 16 according to the present invention. The transmitted signal 28 is received by the receiving antenna 66 which is then sent to the receiver front-end circuitry 68. A phased detected signal 70 is then sent to a demodulation stage 72 which produces a demodulated signal 74. The demodulated signal 74 is sent to a phase-locked loop 76 for determining whether or not the signal 74 is in phase with the expected signal. A typical phase-locked loop 76 integrated circuit is a CD4046 phase-locked loop. If the modulation source 23 has been omitted from the transmitter 20, then the phase detected signal 70 is sent directly to the phase-locked loop 76. The demodulator stage 72 is omitted.

The phase-locked loop 76 acts as a phase tracker: so long as a phase of the signal is discernable, the output of the phase-locked loop 76 is a constant predetermined voltage level which generally is a logical true value. When the phase is lost, the output of the phase-locked loop 76 is a logical false value.

A phase detector 78, loop filter 80, and voltage controlled oscillator 82 measure the phase of the signal 74 and determine whether or not it is of the same phase as a reference phase. The feedback loop 84 determines the output of the phase detector 78. If the signal 74 is in phase, the output from the phase detector 78 will be a logical true value. Any other phase will generate a logical false value from the phase detector 78. Thus, if the signal is in phase the decision circuitry 86 receives a logical true value signal from the phase detector 78 and receives a logical false value if the system is out of phase.

The lock detector indication is sent from the phase-locked loop 76 to the decision circuitry 86. The decision circuity 86 then sends a lock loss signal to the timing circuitry 88 when the decision circuitry 86 receives a logical false value from the phase detector 78. The receipt of the lock loss signal is processed by the timing circuitry 88 to produce a timing signal. If the time since the receipt of the lock loss signal is less than a predetermined period of time, then the timing signal indicates that there has been less than the predetermined period of time since the lock loss. Conversely, if the time since the receipt of the lock loss signal is greater than a predetermined period of time, then the timing signal indicates that there has been greater than the predetermined period of time since the lock loss. The timing signal is sent from the timing circuitry 88 to the decision circuitry 86.

When the decision circuitry 86 receives an indication from the phase-locked loop 76 that the phase lock has been lost and receives an indication from the timing circuitry 88 that the time since the receipt of the lock loss signal is less than the predetermined period of time, then the decision circuitry 86 sends a signal to a warning device 90. The warning device 90 is similar to the warning device 62 described herein above.

When the decision circuitry 86 receives an indication from the phase-locked loop 76 that the phase lock has been lost and receives an indication from the timing circuitry 88 that the time since the receipt of the lock loss signal is greater than the predetermined period of time, then the decision circuitry 86 sends a signal to a control device 92. The control device 92 is similar to the control device 64 described herein above.

In the alternative, the timing circuitry 88 may be omitted from the design. In such a situation, the loss of phase lock would cause the decision circuitry 86 to send a signal to the control device 92 which would give a control indication, such as a shock, to the pet 14.

Figure 5:
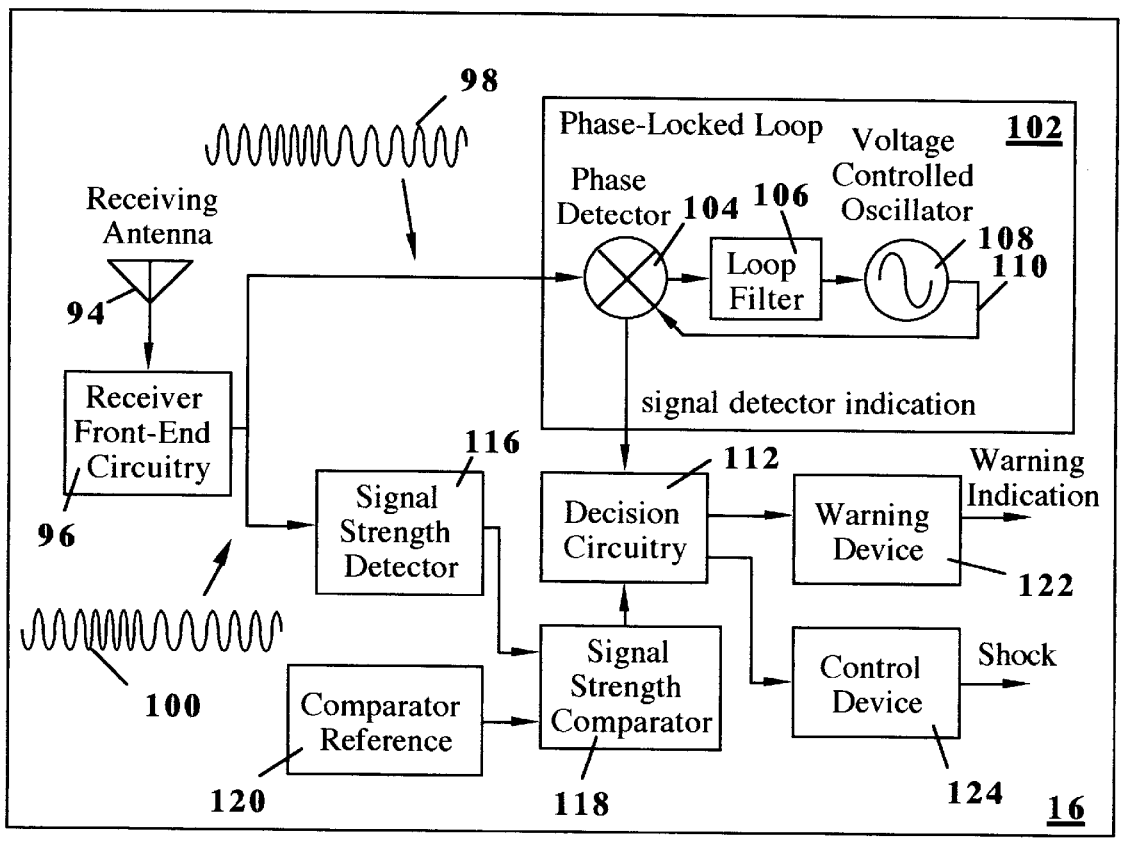
FIG. 5 is a block diagram of a further embodiment of a receiver according to the present invention.

FIG. 5 shows a block diagram of a further preferred embodiment of a receiver 16 according to the present invention. The transmitted signal 28 is received by the receiving antenna 94 which is then sent to the receiver-front end circuitry 96. The signal is then divided into two signals, a signal detected signal 98 and a strength detected signal 100.

The signal detected signal 98 is sent to a phase-locked loop 102 for determining whether or not the signal 98 is present. A typical phase-locked loop 102 integrated circuit is a CD4046 phase-locked loop. Phase-locked loops, such as the phase-locked loop 102, are negative feedback loop systems (i.e., self-correcting systems). Therefore, if there is a difference in the frequency and/or phase between the incoming signal and the voltage controlled oscillator of the phase-locked loop, such as the voltage controlled oscillator 108 of the phase-locked loop 102, then the loop will adjust the voltage controlled oscillator to match the frequency and/or phase of the incoming signal.

For a number of reasons related to stability, the negative feedback loop will generally include filtering, such as the loop filter 106, for low-pass filtering. The filtering is used to control the voltage control oscillator response to signals applied to the phase-locked loop. For example, if a signal varying in frequency is applied to the phase-locked loop, the voltage controlled oscillator will change in frequency along with the signal as long as the rate of change of the frequency does not exceed the cut-off frequency of the loop filter.

Naturally occurring noise in the electromagnetic spectrum is substantially broadband. If the noise band accompanying the desired received electromagnetic signal becomes a significant percentage of the desired signal level, the desired signal will be increasingly obscured. To reduce the noise level, the bandwidth of the system can be reduced to the minimum necessary to pass the desired signal without altering it.

The response of the phase-locked loop to changes in frequency (the "frequency response" of the phase-locked loop) is a bandpass response with a bandwidth that is twice the low-pass bandwidth of the phase-locked loop filter. This is because, whether the voltage controlled oscillator frequency is higher or lower than the desired electromagnetic signal frequency, the difference is the same and the difference in the frequency is limited by the low-pass response of the loop filter.

The usefulness of the phase-locked loop as a narrowband filter is that, unlike traditional filters using fixed value components, the phase-locked loop frequency response can be made narrow enough to pass only the desired signal and any drifting of frequency of the desired signal will be tracked by the voltage controlled oscillator of the phase-locked loop. Hence, the phase-locked loop is a "tracking filter."

The phase-locked loop 102 acts as a signal tracker: so long as the signal is substantially discernable, the output of the phase-locked loop 102 is a constant predetermined voltage level which generally is a logical true value. When the signal is lost, the output of the phase-locked loop 102 is a logical false value.

A phase detector 104, loop filter 106, and voltage controlled oscillator 108 in effect measure the strength of the signal 98 and determine whether or not it is present. The feedback loop 110 determines the output of the phase detector 104 and the phase-locked loop 102 to the decision circuitry 112. If the signal 98 is discernable, the output from the phase detector 104 will be a logical true value. If the signal 98 is not discernable, the phase detector 104 will generate a logical false value. Thus, if the signal is discernable the decision circuitry 112 receives a logical true value signal from the phase detector 104 and receives a logical false value if the system cannot discern the presence of the signal 98.

The strength detected signal 100 is sent to a signal strength detector 116 and is then sent to a signal strength comparator 118. A comparator reference 120 sends a comparison signal to the signal strength comparator 118 which then sends an output to the decision circuitry 112. If the signal from the signal strength detector 116 is less than the signal strength from the comparator reference 120, the signal strength comparator 118 sends a signal to the decision circuitry 112 indicating that the strength detected signal 100 has dropped below the particular strength of the comparator reference 120.

The decision circuitry 112 determines whether or not a warning indication or a shock will be given to the pet 14. If the decision circuitry 112 receives a signal from the phase detector 104 and receives no indication from the signal strength comparator 118 that the strength detected signal 100 has dropped below the comparator reference 120, then there will be no warning indication or shock to the pet. Thus, referring now to FIG. 1, the pet 14 will be within the safe area 18.

If the pet 14 wanders into the warning area 20, the signal from the phase detector 104 will still be a logical true value since the detected signal will be strong enough to allow the phase-locked loop 102 to track it. However, the signal strength of the strength detected signal 100 will have dropped below the comparator reference 120. Therefore, the output from the signal strength comparator 118 will indicate to the decision circuitry 112 that a warning is indicated. The decision circuitry 112 will send a signal to the warning device 122 which will give a warning to the pet 14. This warning indication usually is in the form of a sound produced by a small speaker within the collar/receiver 16.

If the pet goes further, into the shock area 22, the signal detected signal 98 will have degraded to the point where it will no longer be discernible. Therefore, the phase detector 104 will generate a logical false value to the decision circuitry 112. In addition, the signal strength comparator 118 will still produce an indication that the strength detected signal 100 is below that of the comparator reference 120. Therefore, the decision circuitry 112 will generate a signal to the control device 124 which will produce a control signal such as a shock from electrodes in the collar/receiver 16. Thus, a pet 14 will be signaled that it is in a shock area 22 no matter how far it goes from the transmitter. The only time the shocking will stop will be when the pet re-enters the warning area 20 or the safe area 18.

Thus, it can be seen from the foregoing, that the present invention provides a pet containment system which restrains the pet to a particular area without the necessity of wires being buried or being left exposed. In addition, the present system requires little power on the part of the receiver and thus can utilize standard batteries for power.

Having thus described various preferred embodiments of the invention and several of its benefits and advantages, it will be understood by those of ordinary skill that the foregoing description is merely for the purpose of illustration and that numerous substitutions, rearrangements and modifications may be made in the invention without departing from the scope and spirit of the appended claims.

What is claimed is:

1. A pet containment system comprising:
    (a) a transmitter for transmitting a series of electromagnetic signals, wherein said transmitter further includes:
        (1) means for generating the electromagnetic signals,
        (2) means for transmitting the electromagnetic signals, and
        (3) at least one transmitting antenna; and
    (b) a receiver removably attached to the pet, said receiver for receiving the series of electromagnetic signals from said transmitter, wherein said receiver further includes:
        (1) at least one receiving antenna,
        (2) means for comparing the phase of the received electromagnetic signals from said transmitter with a predetermined phase and for producing an electronic indication of a loss of phase, wherein if the phase of the received electromagnetic signals from said transmitter is not substantially in phase with the predetermined phase then the electronic indication of a loss of phase is produced, and
        (3) means for producing a control stimulus to the pet, such that when there is no electronic indication of a loss of phase, then there is no control stimulus to the pet, and when there is an electronic indication of a loss of phase, then there is a control stimulus to the pet.

2. The system of claim 1 wherein the receiver further includes:
    (1) timing means for producing an electronic indication that the amount of time since the loss of phase of the received electromagnetic signals from said transmitter is greater than a predetermined period of time, and
    (2) means for producing a warning stimulus to the pet, such that when there is no electronic indication of a loss of phase, then there is no warning stimulus and no control stimulus to the pet, when there is an electronic indication of a loss of phase and there is no electronic indication that the amount of time since the loss of phase of the received electromagnetic signals from said transmitter is greater than a predetermined period of time, then there is a warning stimulus and no control stimulus, and when there is an electronic indication of a loss of phase and there is an electronic indication that the amount of time since the loss of phase of the received electromagnetic signals from said transmitter is greater than a predetermined period of time, then there is a control stimulus to the pet.

3. The system of claim 2 wherein the receiver further comprises a speaker and the warning stimulus includes a sound.

4. The system of claim 2 wherein the receiver further comprises a light source and the warning stimulus includes a light.

5. The system of claim 1 wherein said transmitter further includes means for modulating the electromagnetic signals, wherein the signals are modulated to produce non-random patterns of electromagnetic energy, and wherein said means for comparing the signal phase of the electromagnetic signals transmitted by said transmitter further includes
    (i) demodulating means for demodulating the received electromagnetic signals transmitted by said transmitter, thereby producing a demodulated signal, and
    (ii) at least one phase-locked loop for receiving the demodulated signal and for producing an electronic indication of a loss of phase, wherein when the phase-locked loop indicates that the phase of the demodulated received signal is different than a predetermined phase then the phase-locked loop generates an electronic indication of a loss of phase.

6. The system of claim 5 wherein the electromagnetic signals transmitted by said transmitter are amplitude modulated.

7. The system of claim 5 wherein the electromagnetic signals transmitted by said transmitter are frequency modulated.

8. The system of claim 5 wherein the modulated electromagnetic signals transmitted by said transmitter are modulated in a pulse train having a particular nonrandom pattern.

9. The system of claim 1 wherein the receiver further comprises electrodes and the control stimulus includes a shock to the pet.

10. The system of claim 1 wherein the electromagnetic energy of the electromagnetic signals is radio frequency energy.

11. The system of claim 1 wherein the electromagnetic energy of the electromagnetic signals is light.

12. A method for producing an area for the containment of a pet, the method comprising:
 (a) transmitting a series of electromagnetic signals from a transmitter, further including:
  (1) generating the electromagnetic signals, and
  (2) transmitting the electromagnetic signals;
 (b) attaching a releasable electromagnetic energy receiver to a pet;
 (c) receiving the series of electromagnetic signals with the releasable electromagnetic energy receiver;
 (d) comparing the phase of the received electromagnetic signals received with the,releasable electromagnetic energy receiver with a predetermined phase and producing an electronic indication of a loss of phase, wherein if the phase of the received electromagnetic signals with the releasable electromagnetic energy receiver is not substantially in phase with the predetermined phase then the electronic indication of a loss of phase is produced;
 (e) producing no control stimulus to the pet when there is no electronic indication of a loss of phase;
 (f) producing a control stimulus to the pet when there is an electronic indication of a loss of phase.

13. The method of claim 12 further comprising:
 (a) producing an electronic indication that the amount of time since the loss of phase of the received electromagnetic signals from the transmitter is greater than a predetermined period of time;
 (b) producing a warning stimulus to the pet when there is an electronic indication of a loss of phase and there is no electronic indication that the amount of time since the loss of phase of the received electromagnetic signals from the transmitter is greater than a predetermined period of time; and
 (c) producing a control stimulus to the pet when there is an electronic indication of a loss of phase and there is an electronic indication that the amount of time since the loss of phase of the received electromagnetic signals from the transmitter is greater than a predetermined period of time.

14. The method of claim 12 wherein said transmitting a series of electromagnetic signals further includes modulating the electromagnetic signals, wherein the signals are modulated to produce non-random patterns of electromagnetic energy, and wherein said comparing the signal phase of the electromagnetic signals received with the releasable electromagnetic energy receiver further includes (i) demodulating the received electromagnetic signals, thereby producing a demodulated signal, and
 (ii) receiving the demodulated signal in at least one phase-locked loop and producing an electronic indication of a loss of phase, wherein when the phase-locked loop indicates that the phase of the demodulated received signal is different than a predetermined phase then the phase-locked loop generates an electronic indication of a loss of phase.

15. The method of claim 14 further comprising amplitude modulating the transmitted electromagnetic signals.

16. The method of claim 14 further comprising frequency modulating the transmitted electromagnetic signals.

17. The method of claim 14 further comprising modulating the transmitted electromagnetic signals in a pulse train having a particular nonrandom pattern.

18. The system of claim 12 wherein the electromagnetic energy of the non-random patterns of electromagnetic energy is radio frequency energy.

19. The system of claim 12 wherein the electromagnetic energy of the non-random patterns of electromagnetic energy is light.

20. A pet containment system comprising:
 (a) a transmitter for transmitting a series of electromagnetic signals, wherein said transmitter further includes:
  (1) means for generating the electromagnetic signals,
  (2) means for transmitting the non-random patterns of electromagnetic signals, and
  (3) at least one transmitting antenna; and
 (b) a receiver removably attached to the pet, said receiver for receiving the series of electromagnetic signals from said transmitter, wherein said receiver further includes:
  (1) at least one receiving antenna,
  (2) means for comparing the signal level of the received electromagnetic signals from said transmitter with a predetermined level and for producing an electronic indication of a loss of signal level, wherein if the signal level of the received electromagnetic signals from said transmitter is less than the predetermined level then the electronic indication of a loss of signal level is produced,
  (3) means for determining the substantial presence of the received electromagnetic signals from said transmitter and for producing an electronic indication of a loss of received signal, wherein if the received electromagnetic signals from said transmitter are not substantially present then the electronic indication of a loss of received signal is produced,
  (4) means for producing a warning stimulus to the pet, and
  (5) means for producing a control stimulus to the pet, such that when there is no electronic indication of a loss of signal level and there is no electronic indication of a loss of received signal, then there is no warning stimulus and there is no control stimulus to the pet, when there is an electronic indication a loss of received signal, then there is a warning stimulus to the pet, and when there is an electronic indication of a loss of signal level and there is an electronic indication of a loss of received signal, then there is a control stimulus to the pet.

21. The system of claim 20 wherein said means for determining the substantial presence of the received electromagnetic signals from said transmitter further includes at least one phase-locked loop for receiving the transmitted signal and for producing an electronic indication of a loss of received signal, wherein when the phase-locked loop indicates that the received signal is substantially absent then the phase-locked loop generates an electronic indication of a loss of received signal.

22. The system of claim 20 wherein the receiver further comprises a speaker and the warning stimulus includes a sound.

23. The system of claim 20 wherein the receiver further comprises a light source and the warning stimulus includes a light.

24. The system of claim 20 wherein the receiver further comprises electrodes and the control stimulus includes a shock to the pet.

25. The system of claim 20 wherein the electromagnetic energy of the non-random patterns of electromagnetic energy is radio frequency energy.

26. The system of claim 20 wherein the electromagnetic energy of the non-random patterns of electromagnetic energy is light.

27. A method for producing an area for the containment of a pet, the method comprising:

(a) transmitting a series of electromagnetic signals, further including:
  (1) generating the electromagnetic signals, and
  (2) transmitting the electromagnetic signals;

(b) attaching a releasable electromagnetic energy receiver to the pet;

(c) receiving the series of electromagnetic signals with the releasable electromagnetic energy receiver;

(d) comparing the signal level of the received electromagnetic signals received with the releasable electromagnetic energy receiver with a predetermined level and producing an electronic indication of a loss of signal level, wherein if the signal level of the received electromagnetic signals with the releasable electromagnetic energy receiver is less than the predetermined level then the electronic indication of a loss of signal level is produced;

(e) determining the presence of the received electromagnetic signals received with the releasable electromagnetic energy receiver and producing an electronic indication of a loss of received signal, wherein if the received electromagnetic signals are not substantially detected then the electronic indication of a loss of received signal is produced;

(f) producing no warning stimulus to the pet when there is no electronic indication of a loss of signal level and there is no electronic indication of a loss of received signal;

(g) producing a warning stimulus to the pet when there is an electronic indication of a loss of signal level and there is no electronic indication of a loss of received signal; and (h) producing a control stimulus to the pet when there is an electronic indication of a loss of signal level and there is an electronic indication of a loss of received signal.

28. The method of claim 27 wherein said detecting of the electromagnetic signals received with the releasable electromagnetic energy receiver further includes receiving the signal in at least one phase-locked loop and producing an electronic indication of a loss of received signal, wherein when the phase-locked loop indicates that the received signal is substantially not present then the phase-locked loop generates an electronic indication of a loss of received signal.

29. The method of claim 27 wherein the electromagnetic energy of the non-random patterns of electromagnetic energy is radio frequency energy.

30. The method of claim 27 wherein the electromagnetic energy of the non-random patterns of electromagnetic energy is light.

* * * * *